(12) United States Patent
Kobayashi et al.

(10) Patent No.: US 6,750,911 B1
(45) Date of Patent: Jun. 15, 2004

(54) IMAGING APPARATUS AND DIGITAL CAMERA

(75) Inventors: Akio Kobayashi, Kyotanabe (JP); Hidefumi Okada, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/472,016

(22) Filed: Dec. 27, 1999

(30) Foreign Application Priority Data

Dec. 28, 1998 (JP) .......................................... 10-373249

(51) Int. Cl.$^7$ ........................ H04N 5/225; H04N 5/335
(52) U.S. Cl. ...................... 348/273; 348/317; 348/322; 348/272
(58) Field of Search ................................ 348/272–280, 348/322

(56) References Cited

U.S. PATENT DOCUMENTS 5,966,174 A * 10/1999 Yamamoto et al. ......... 348/319
6,169,577 B1 * 1/2001 Iizuka ........................ 348/317

FOREIGN PATENT DOCUMENTS

JP 10-136244 * 11/1996 .......... H04N/5/225

* cited by examiner

*Primary Examiner*—Andrew Christensen
*Assistant Examiner*—Gary L Solomon
(74) *Attorney, Agent, or Firm*—Armstrong, Kratz, Quintos, Hanson & Brooks, LLP

(57) ABSTRACT

A digital camera includes a CCD imager mounted at a front with a primary color filter. An optimal shutter speed is calculated based on a camera signal outputted from the CCD imager upon a pre-exposure. Where a calculated optimal shutter speed is low, a timing generator drives the CCD imager by a pixel-mixing scheme. Charges are first read out of part of the light receiving elements and transferred in a vertical direction. When the charges are transferred by a predetermined distance, the remaining part of the light receiving elements are read out. As a result of this, the charges of a same color of color components are mixed together. That is, a filtering process is effected within the CCD imager to remove aliasing components.

7 Claims, 17 Drawing Sheets

| R | G | R | G | R |
|---|---|---|---|---|
| G | B | G | B | G |
| R | G | R | G | R |
| G | B | G | B | G |
| R | G | R | G | R |
| G | B | G | B | G |
| R | G | R | G | R |
| G | B | G | B | G |

FIG. 5

(A) ODD COLUMN (B) EVEN COLUMN

FIG. 6

(A) ODD COLUMN

| | | SBG | 2line Shift | | SGA | |
|---|---|---|---|---|---|---|
| | | T1 | T2 | | T3 | T4 |
| R4 | V1 V3 V2A | R4 | | | | |
| G4 | V1 V3 V2A | G4 | | | | |
| R3 | V1 V3 V2B | | R4 | | R3 + R4 | |
| G3 | V1 V3 V2B | | G4 | | G3 + G4 | |
| R2 | V1 V3 V2A | R2 | | | | |
| G2 | V1 V3 V2A | G2 | | | | |
| R1 | V1 V3 V2B | | R2 | | R1 + R2 | |
| G1 | V1 V3 V2B | | G2 | | G1 + G2 | |

(B) EVEN COLUMN

| | | SBG | 2line Shift | | SGA | |
|---|---|---|---|---|---|---|
| | | T1 | T2 | | T3 | T4 |
| G4 | V1 V3 V2A | G4 | | | | |
| B4 | V1 V3 V2A | B4 | | | | |
| G3 | V1 V3 V2B | | G4 | | G3 + G4 | |
| B3 | V1 V3 V2B | | B4 | | B3 + B4 | |
| G2 | V1 V3 V2A | G2 | | | | |
| B2 | V1 V3 V2A | B2 | | | | |
| G1 | V1 V3 V2B | | G2 | | G1 + G2 | |
| B1 | V1 V3 V2B | | B2 | | B1 + B2 | |

FIG. 10  THINNING-OUT READING MODE (IN PERIOD A)

PIXEL-MIXING READING MODE

FIG. 13 PIXEL-MIXING READING MODE (IN PERIOD A)

PIXEL-MIXING READING MODE (IN OTHER PERIOD THAN A)

FIG. 17

| Ye | Cy | Ye | Cy | Ye |
|----|----|----|----|----|
| G  | Mg | G  | Mg | G  |
| Ye | Cy | Ye | Cy | Ye |
| G  | Mg | G  | Mg | G  |
| Ye | Cy | Ye | Cy | Ye |
| G  | Mg | G  | Mg | G  |
| Ye | Cy | Ye | Cy | Ye |
| G  | Mg | G  | Mg | G  |

IMAGING APPARATUS AND DIGITAL CAMERA

BACKGROUND OF THE INVENTION

FIELD OF THE INVENTION

This invention relates generally to imaging apparatuses and digital cameras and, more particularly, to an imaging apparatus for reading charges out of light receiving elements of a CCD imager to create a low-resolution camera signal, and to a digital camera provided with such an imaging apparatus. Description of the related art.

In a conventional digital camera in which, where charges are read with thinning out from a CCD imager, the read-out charges are transferred to the CCD imager and then outputted therefrom in a separate fashion.

However, such charge reading with thinning out is equivalent to charge sampling. According to a sampling theorem, such an output camera signal contains aliasing components. A filter can eliminate such aliasing components. The addition of a filter, however, raises cost correspondingly.

SUMMARY OF THE INVENTION

It is therefore a primary object of the present invention is to provide, at low cost, an imaging apparatus in which noise is prevented from occurring.

Another object of the invention is to provide at low cost a digital camera in which noise is prevented from occurring.

An imaging apparatus of the present invention comprises: a CCD imager of an interline transfer scheme having a plurality of light receiving elements and a plurality of vertical transfer registers; a color filter having a plurality of color elements arranged such that one of the color components corresponds to one of the light receiving elements; and a pulse generator for generating a drive pulse to drive the CCD imager; wherein the color filter has a vertical column arranged with a plurality of colors of color elements, and the drive pulse is a pulse to drive the CCD imager such that charges of a same color of color elements are mixed together on a corresponding vertical transfer register to the vertical column.

According to this invention, the CCD imager of an interline transfer scheme has a plurality of light receiving elements and a plurality of vertical transfer registers while a color filter has a plurality of color elements, each of which corresponds to associated one of the light receiving elements. The CCD imager is driven by a drive pulse generated by a pulse generator. Here, the color filter has a vertical column arranged with a plurality of color elements. Also, the drive pulse is a pulse to drive the CCD imager such that the charges of a same color of the color components are mixed together on a corresponding one of the vertical transfer registers to the vertical column.

The drive to the CCD imager such that the charges of a same color of the color elements are mixed together provides a filtering process to be performed within the CCD imager, thereby removing aliasing components. Accordingly, there is no necessity of newly providing a filter circuit to remove noise.

In one embodiment of the invention, the drive pulse includes a first read pulse to read a first charge produced by a first light receiving element onto the corresponding vertical transfer register, a vertical transfer pulse to transfer the first charge in a vertical direction, and a second read pulse to read a second charge produced by a second light receiving element onto the vertical transfer register when the first charge has been transferred in the vertical direction by a predetermined distance. Here, the first light receiving element and the second light receiving element have a same color of color elements.

Preferably, the vertical column is arranged alternately with two color of colors elements, and the predetermined distance corresponding to a length of two light receiving elements in the vertical direction.

In another embodiment of the invention, the color filter is a filter arranged with primary colors of color elements in a Bayer arrangement.

In still another embodiment of the invention, the vertical transfer register is formed by a plurality of metals, and at least three of the metals is assigned to one of the light receiving elements.

A digital camera according to the present invention comprises a CCD imager of an interline transfer scheme having a plurality of light receiving elements and a plurality of vertical transfer registers; a color filter having a plurality of color elements arranged such that one of the color components corresponds to one of the light receiving elements; and a driver for driving the CCD imager; wherein the color filter has a vertical column arranged with a plurality of colors of color elements, and the drive means driving the CCD imager such that charges of a same color of color elements are mixed together on a corresponding vertical transfer register to the vertical column.

According to this invention, the CCD imager of an interline transfer scheme has a plurality of light receiving elements and a plurality of vertical transfer registers while a color filter has a plurality of color element each of which correspond to associated one of the light receiving elements. The CCD imager is driven by a drive means. Here, the color filter has a vertical column arranged with a plurality of color elements. Also, the driver drives the CCD imager such that the charges of a same color of the color components are mixed together on a corresponding one of the vertical transfer registers to the vertical column.

The drive to the CCD imager such that the charges of a same color of the color elements are mixed together provides a filtering process to be performed within the CCD imager, thereby removing aliasing components. Accordingly, there is no necessity of newly providing a filter circuit to remove noise.

In one embodiment of the invention, the drive means includes a first read means to read a first charge produced by a first light receiving element onto the vertical transfer register, a vertical transfer means to transfer the first charge in a vertical direction, and a second read means to read a second charge produced by a second light receiving element onto the vertical transfer register when the first charge has been transferred in the vertical direction by a predetermined distance. Here, the first light receiving element and the second light receiving element have a same color of color elements.

Preferably, the vertical column is arranged alternately with two colors of color elements, and the predetermined distance corresponding to a length of two light receiving elements in the vertical direction.

In another embodiment of the invention, the color filter is a filter arranged with primary colors of color elements in a Bayer arrangement.

In still another embodiment of the invention, the vertical transfer register is formed by a plurality of metals, and at least three of the metals being assigned to one of the light receiving elements.

In yet another embodiment of the invention, an exposure means exposes a subject image to the CCD imager. Here, a calculation means calculates an optimal amount of exposure by the CCD imager. A setting means sets the optimal amount of exposure to the exposure means. A disabling means disables the second read means depending upon the optimal amount of exposure.

Preferably, the optimal amount of exposure is defined based on a shutter speed, and the disabling means disabling the second read means when the shutter speed is higher than a predetermined value.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing a primary color filter;

FIG. 5 is an illustrative view showing part of operation in a thinning-out reading mode;

FIG. 6 is an illustrative view showing part of operation in a pixel-mixing reading mode;

FIG. 17 is an illustrative view showing a complementary color filter.

DETAILED DESCRIPTION OF THE PREFERRED EMBODIMENTS

Figure 1:
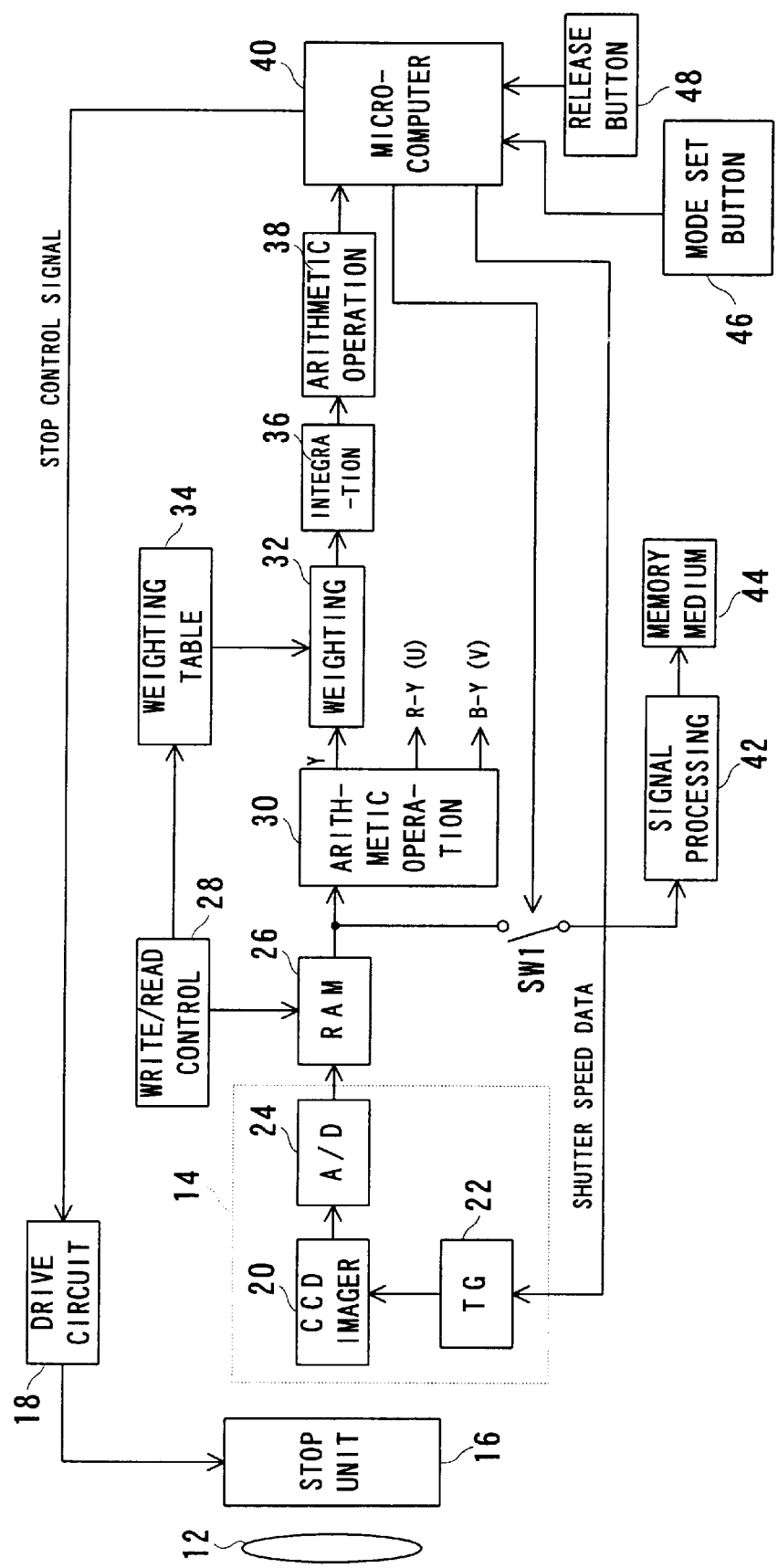
FIG. 1 is a block diagram showing one embodiment of the present invention.
Figure 2:
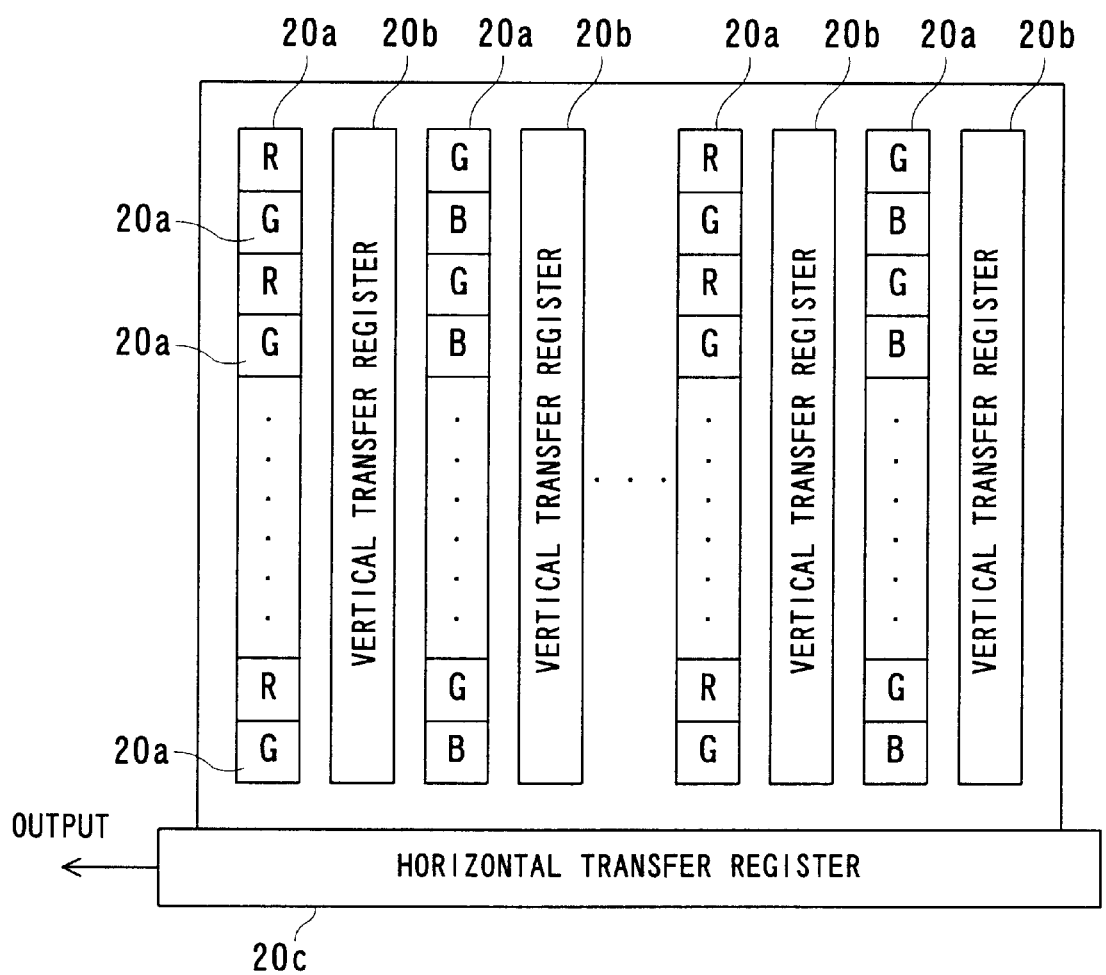
FIG. 2 is an illustrative view showing a CCD imager.

Referring to FIG. 1, a digital camera 10 of this embodiment includes a lens 12. An incident optical image from the lens 12 is passed through an aperture-stop unit 16 and then provided to a CCD imager 20 of an interline transfer scheme provided on an imaging apparatus 14. The CCD imager 20 has a plurality of light receiving elements 20a formed as shown in FIG. 2. Each light receiving element 20a constitutes a pixel for the CCD imager 20. At a front of the light receiving elements 20a is provided a primary color filter 20d having color elements R, G and B in a Bayer arrangement. Each light receiving element 20a has any one of color elements R, G and B. That is, one color element corresponds to one light receiving element. The subject image is passed through the primary color filter 20d thus configured and then provided to the light receiving elements 20a where photoelectric conversion is conducted on the image.

If it is considered herein that the primary color filter 20a is a gathering of color blocks each formed by 2 lines X 2 pixels, then the color block has a color element G on >one diagonal line and color elements R and B on the other diagonal line. A plurality of such color blocks exist throughout the primary color filter 20a so that the color blocks are adjacent to one another in both vertical and horizontal directions. Meanwhile, if considering vertical columns forming the primary color filter 20a, color elements R and G are alternately arranged at an interval of one pixel on a certain vertical column while color elements G and B are alternately placed at an interval of one pixel on another vertical column. That is, on any vertical column two color elements are alternately arranged at an interval of one pixel.

Referring back to FIG. 2, the CCD imager 20 includes a plurality of light receiving elements 20a corresponding to respective pixels, a plurality of vertical transfer registers 20b for vertically transferring the charges photoelectrically converted and stored by the light receiving elements 20a, and a horizontal transfer register 20c provided at the ends of the vertical transfer registers 20b to horizontally transfer the charges transferred through the vertical transfer registers 20b. The CCD imager 20 is driven by drive pulses outputted from a timing generator (TG) 22. Here, the drive pulses involve a read pulse to read charges out of the light receiving element 20a onto the vertical transfer register 20b, a vertical transfer pulse to vertically transfer the read charges line by line, a horizontal transfer pulse to horizontally transfer the charges over the horizontal transfer register 20c, and a sweep-out pulse to sweep out onto an overflow drain (not shown) the charges created by the light receiving elements 20a during a non-exposure time, or charge non-storage period.

Figure 4:
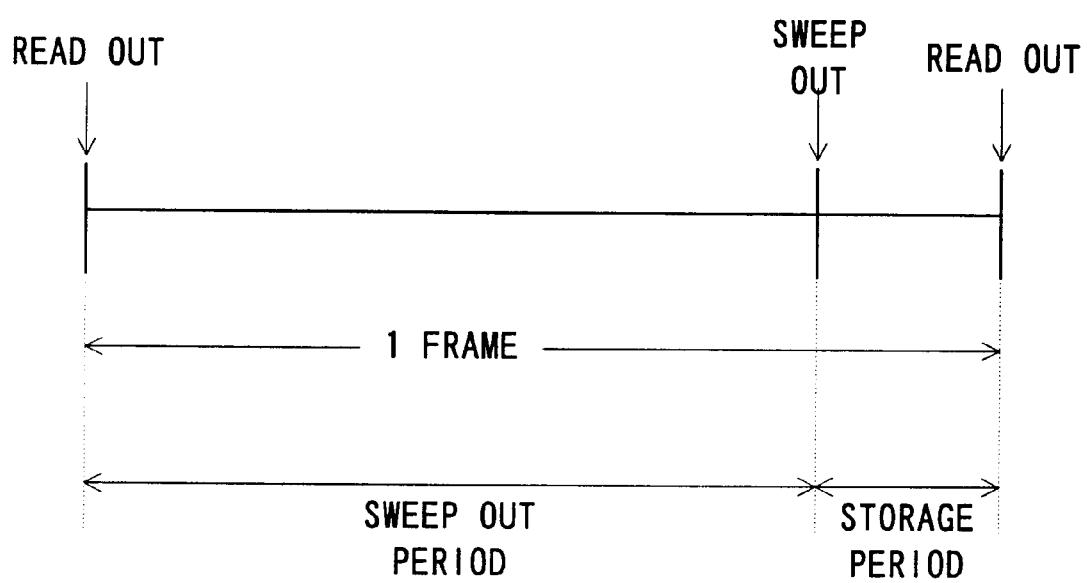
FIG. 4 is an illustrative view showing part of operation of the FIG. 1 embodiment.

If a camera mode is established by a mode set button 46 and a release button 48 is pushed, a pre-exposure is first effected, to thereby provide charges to be read out of the CCD imager 20. During the pre-exposure, the TG 22 controls an output period of a sweep-out pulse depending upon initial shutter speed data set by a microcomputer 40. As shown in FIG. 4, a sweep-out period starts at a beginning of a 1-frame period being considered. An end time of the sweep-out period is controlled by the shutter speed data. In this manner, the charge storage period is varied to realize an exposure with a desired shutter speed (exposure time). Note that the technique of controlling a shutter speed using a sweep-out pulse output period is well-known as an electronic shutter function.

The output pixel signal (camera signal) of the CCD imager 20 is converted by an A/D converter 24 into a digital signal, or pixel data. This pixel data is written onto a RAM 26 by a write/read control circuit 28. The pixel data stored on the RAM 26 is read out by the same write/read control circuit 28 and inputted to an arithmetic operation circuit 30.

The input pixel data has any one of the color components R, G and B. The arithmetic operation circuit 30 performs color interpolation and YUV conversion on the pixel data, thus creating Y data, U data and V data. Among these, the Y data is inputted to a weighting circuit 32. The weighting circuit 32 multiplies the Y data by a weighting amount held within a weighting amount table 34. The weighting amount table 34 receives reading address data sent from the write/read control circuit 28, and outputs a corresponding weighting amount. The Y data is subjected to a weighting process using this weighting amount, thereby making possible center-weighted photometry. The Y data outputted from the weighting circuit 32 is integrated at an interval of a 1-frame period by an integrator 36. An arithmetic operator 38 divides the integration data outputted from the integrator 36 by a sum of weighting to calculate a luminance evaluation value to be evaluated upon exposure adjustment. Incidentally, the U data and V data calculated together with the Y data by the arithmetic operator 30 are delivered to a (not-shown) white balance adjustment circuit.

The microcomputer 40 fetches the luminance evaluation value outputted from the arithmetic operator 38, and updates a shutter speed depending upon the luminance evaluation value. After calculating an optimal shutter speed (optimal exposure time), the microcomputer 40 effects a main exposure, producing a camera signal. The camera signal is delivered through a switch SW1 to a signal processing circuit 42 where the signal is subjected to a predetermined processing and then stored to a recording medium 44.

The microcomputer 40 sets either of a thinning-out reading scheme or a pixel-mixing reading scheme onto the TG 22 depending upon the optimal shutter speed. Considering vertically-succeeding 4 pixels, in the thinning-out reading scheme charges are read out of predetermined 2 pixels of these 4 pixels. On the other hand, in the pixel-mixing reading scheme charges are read out of the all 4 pixels and the pixels with a same color component are mixed with. Accordingly, even if any scheme is set, a resulting camera signal will have the number of pixels.

With reference to vertically-lined pixels as shown in FIG. 5(A), FIG. 5(B), FIG. 6(A) and FIG. 6(B), the reading schemes are explained in greater detail. The vertical transfer register 20b is formed by a plurality of metals (electrodes) M, wherein one light receiving element 20a (pixel) is assigned with three metals M. Because the color filter 20d is a primary color filter having R, G and B in a Bayer arrangement, an odd-numbered vertical column (odd numbered column) has pixels R and B alternately arranged at an interval of 1 pixel while an even-numbered vertical column (even numbered column) has pixels G and B alternately placed at an interval of 1 pixel. Considering the three metals M assigned to each pixel, a pulse VI is applied to an uppermost-positioned metal M. A pulse V3 is applied to a central metal M. A pulse V2A or V2B is applied to an lowermost-positioned metal M. The destinations to be applied by the pulses V2A and V2B are switched at an interval of 2 pixels. That is, if on an odd-numbered column a pulse V2A is applied to R and G pixels as a former half of succeeding pixels R, G, R and G, a pulse V2B will be given to a latter half of pixels R and G. Also on an even-numbered column, when a V2A pulse is applied to a former half of pixels G and B of the succeeding 4 pixels, a pulse V2B will be given to the pixels G and B as a latter half.

In the CCD imager 20 having light receiving elements each assigned with three metals M as above, it is possible to perform progressive scanning of pixels. This is meant to transfer the charges read out of adjacent light receiving elements in a separate fashion even where charges are simultaneously read from all the light receiving elements. That is, even during all-pixel reading, the signals R, G and B obtained from the pixels are outputted from the CCD imager 20 without being mixed with each other.

Figure 5:
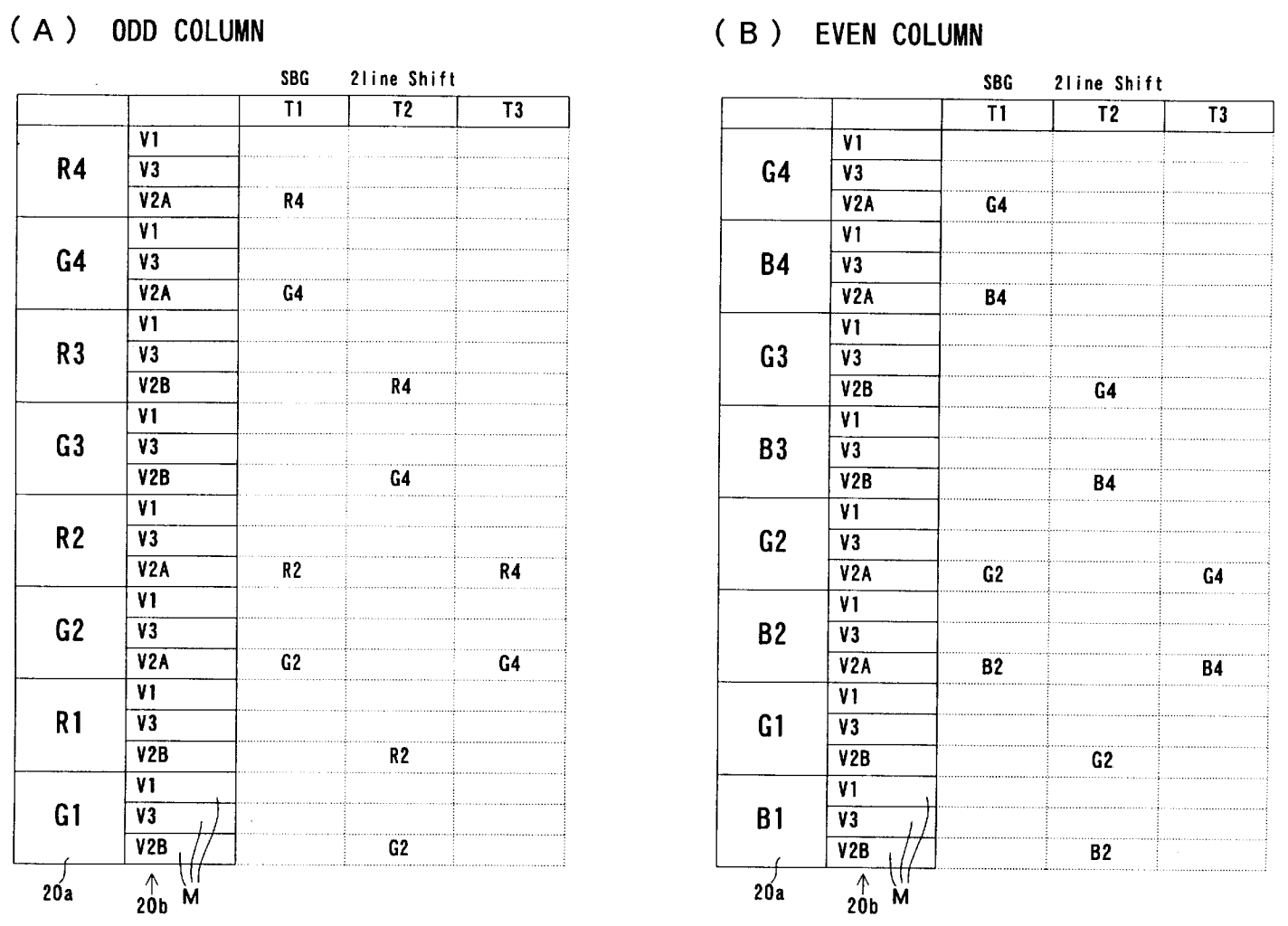

Referring to FIG. 5(A) and FIG. 5(B), if a thinning-out reading scheme is selected, the reading charges from the pixels to which the V2B pulse is applied suspended so that only the pixels applied by the V2A pulse are read of charges therefrom. As a result of this, vertically-succeeding two pixels are read out at an interval of 2 pixels. On an odd-numbered column, signals R4, G4, R2 and G2 are read out and vertically transferred over a corresponding vertical transfer register 20b in a separate fashion. On the other hand, on an even numbered column, signals G4, B4, G2 and B2 are read out and vertically transferred over a corresponding vertical transfer register 20b in a separate manner. That is, when a thinning-out reading scheme is selected, the color blocks to be read out are those existing every other block with respect to the vertical direction. The vertically-transferred pixel signals are then horizontally transferred on a line-by-line basis. The camera signal outputted from the CCD imager 20 contains all the color components of R, G and B.

Referring to FIG. 6(A) and FIG. 6(B), when a pixel-mixing reading scheme is selected, charges are read out of all the pixels. In such a case, charges are first read from the pixels applied by the V2A pulse, and then the pixels applied by the V2B pulse are read of charges when the read charges have been transferred by two pixels. On an odd numbered column, signals R4, G4, R2 and G2 are first read onto and transferred over the vertical transfer register. After vertical transfer by two lines has been completed, signals R3, G3, R1 and G1 are read out. As a result of this, the charges of a same color element are mixed with each other, thereby providing signals (R3+R4), (G3+G4), (R1+R2) and (G1+G2). On an even numbered column, signals G4, B4, G2 and B2 are first read onto the vertical transfer register 20b. When these signals have been vertically transferred by 2 lines, signals G3, B3, G1 and B1 are read onto the same vertical register 20b. This provides signals (G3+G4), (B3+B4), (G1+G2) and (B1+B2).

That is, if a pixel-mixing reading scheme is selected, pixel signals are first read out of the color blocks positioned every other block with respect to the vertical direction. When the pixel signals have been vertically transferred by 2 lines, pixel signals are then read from the remaining color blocks. This causes mixing together of-the pixel signals of a same color component. The mixed pixel signals are vertically transferred in a manner of not mixed with different color components, and then horizontally transferred on a line-by-line basis. That is, a camera signal containing all the color components R, G and B is outputted from the CCD imager 20.

Figure 7:
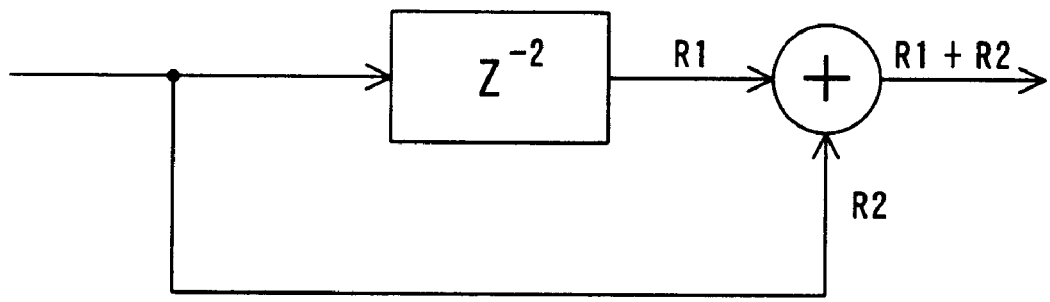
FIG. 7 is a block diagram showing an example of a filter.

In a thinning-out reading scheme, an aliasing component will be included in the camera signal according to a sampling theorem. Consequently, noise will appear unless an aliasing component is removed from the camera signal by using a filtering process. Contrary to this, in the pixel-mixing reading scheme when one pixel signal has been vertically transferred by 2 lines, the other pixel signal is read out, followed by mixing the both pixel signals. This transfer scheme is equivalent to a filtering process, as shown in FIG. 7. That is, considering signals R1 and R2, a signal R1 is read out with a delay to a signal R2, followed by adding together the both. Where a pixel-mixing reading scheme is selected, a filtering process is performed in this manner, whereby an aliasing component is removed from the camera signal.

Figure 8:
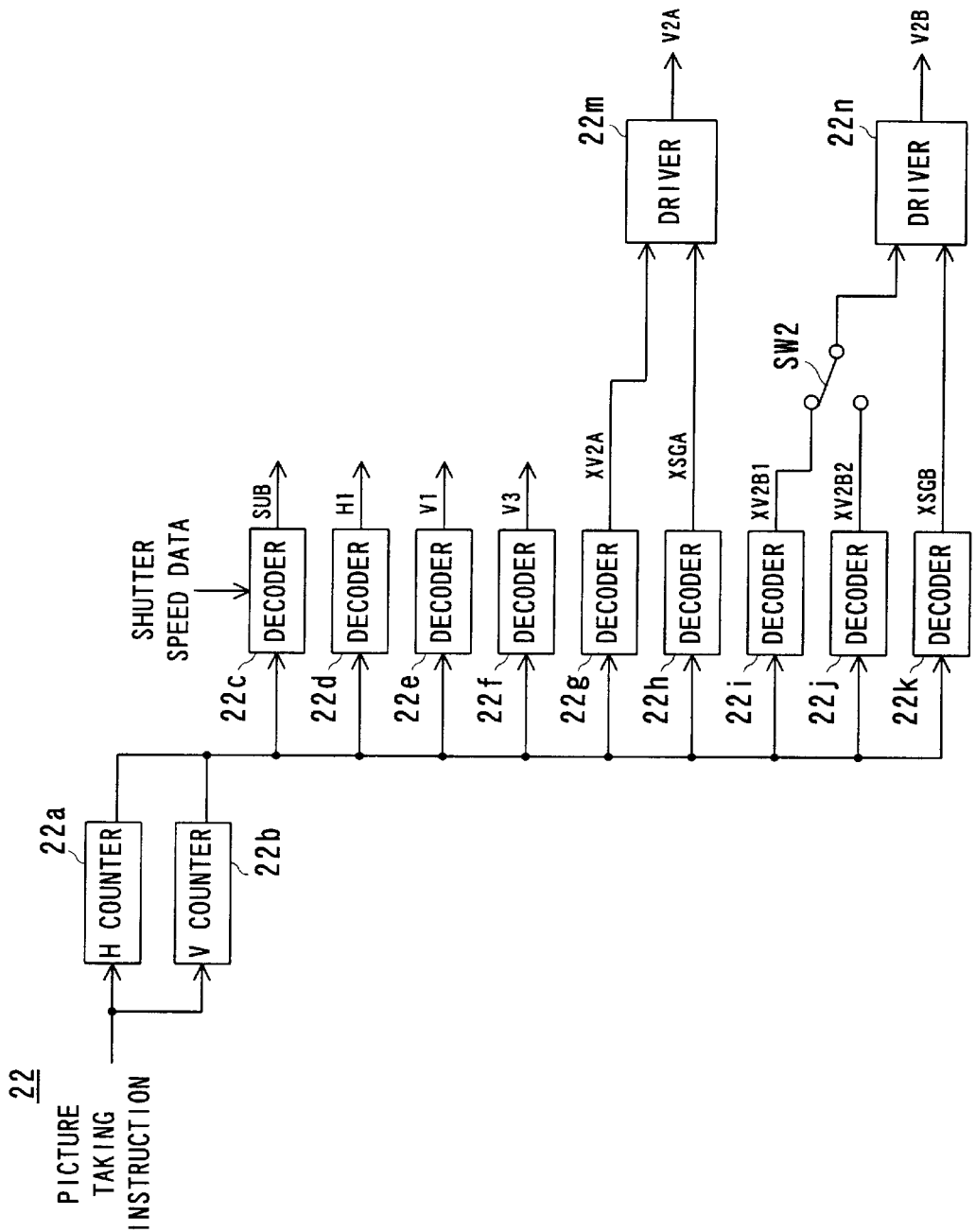
FIG. 8 is a block diagram showing an example of TG.

The TG 22 for charge transfer is configured as shown in FIG. 8. An H counter 22a counts the horizontal number of pixels. The horizontal count value is reset responsive to a picture taking instruction or horizontal synchronizing signal given from the microcomputer 40, and incremented in response to a pixel clock. On the other hand, a V counter 22b counts the vertical number of lines. The vertical count value is reset responsive to a picture taking instruction or vertical synchronizing signal, and incremented responsive to a horizontal synchronizing signal. The horizontal and the vertical count values are both delivered to decoders 22c–22k. The decoder 22c creates a charge sweep-out pulse SUB based on these count values and shutter speed data given from the microcomputer 40. Also, the decoder 22d creates a horizontal transfer pulse HI (pulse HI) from an input count values. The decoders 22e and 22f respectively create a vertical transfer pulse VI (pulse, V1) and a vertical transfer pulse V3 (pulse V3) from the count values.

Furthermore, the decoders 22g–22k respectively create timing pulses XV2A, XSGA, XV2B1, XV2B2 and XSGB. Among them, the timing pulses XV2A and XSGA are supplied directly to a driver 22m. On the other hand, the timing pulses XV2B1 and XV2B2 are supplied to the driver 22m through a switch SW2 while the timing pulse XSGB is directly supplied to the driver 22m. The microcomputer 40 connects the switch SW2 to a decoder 22i side when a thinning-out reading scheme is selected, and connects the switch SW2 to a decoder 22j side when a pixel-mixing reading scheme is selected. Consequently, during thinning-out reading, a timing pulse XV2B1 is inputted to a driver 22n. During pixel-mixing reading, a timing pulse XV2B2 is inputted to the driver 22n. The drivers 22m and 22n respectively create a vertical transfer pulse V2A (V2A pulse) and a vertical transfer pulse V2B (V2B pulse) based on timing pulses supplied.

Figure 9:
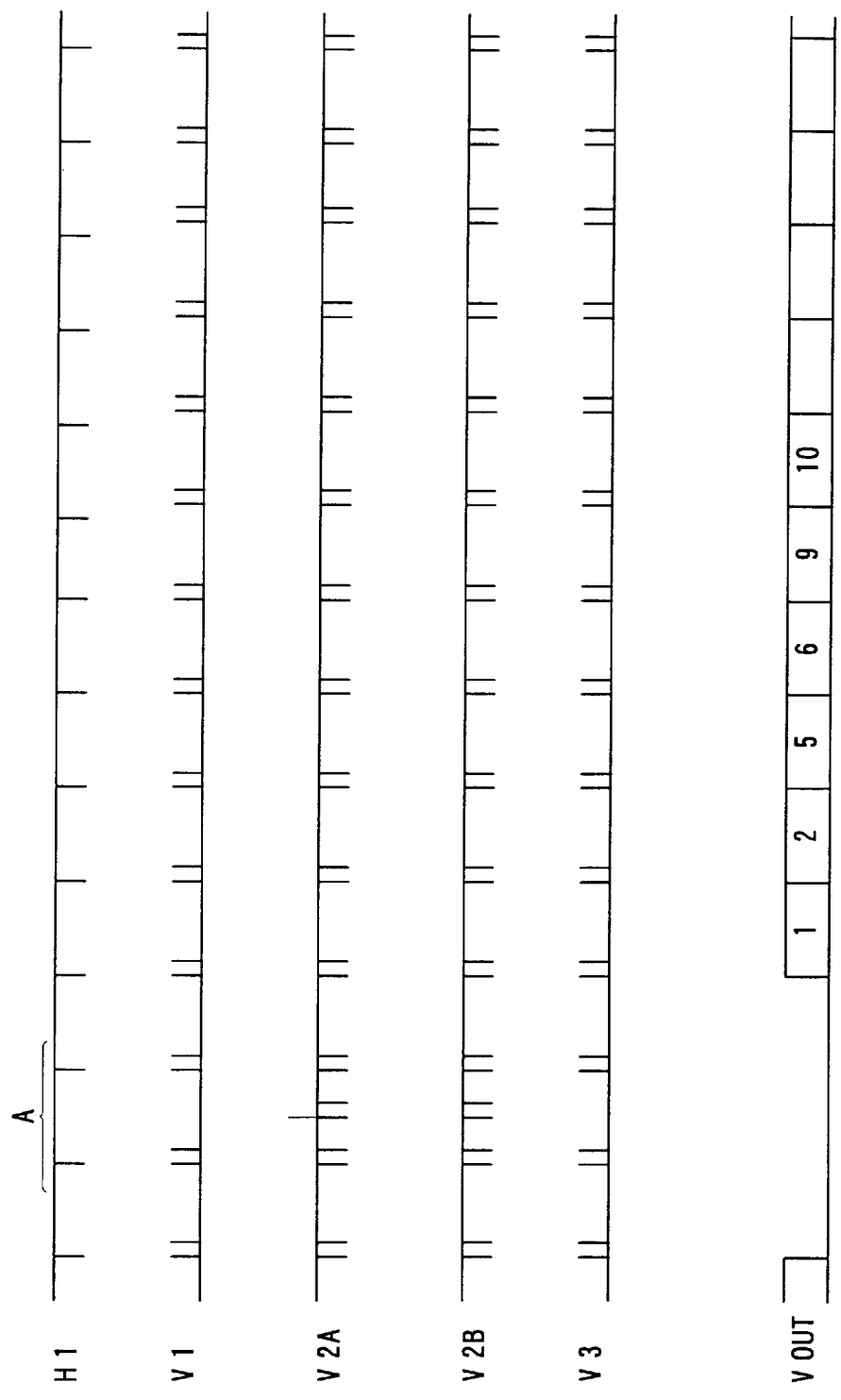
FIG. 9 is a timing chart showing part of operation in a thinning-out reading mode.
Figure 12:
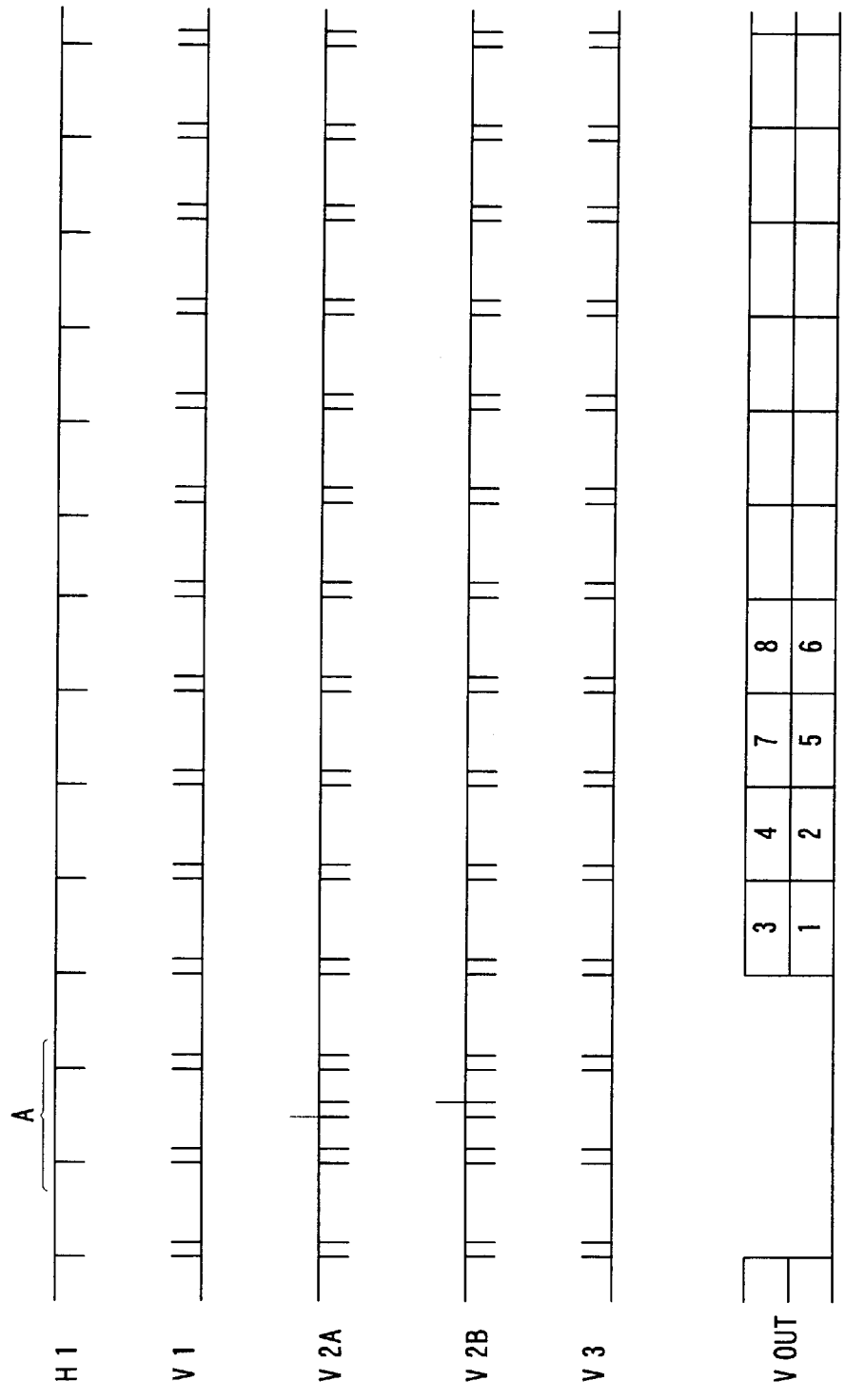
FIG. 12 is a timing chart showing part of operation in the pixel-mixing reading mode.

As can be seen in FIG. 9 and FIG. 12, the pulses HI, VI, V2A and V3 are common between those reading schemes whereas the pulse V2B is different depending upon a reading scheme. During thinning-out reading, only the pulse V2A assumes a positive polarity in a period A with a result that charges are read out of the pixels applied by the V2A pulse. That is, charge reading is made impossible from the pixels applied by the V2B pulse. Meanwhile, during pixel-mixing reading, in the same period A only the pulse V2A assumes a positive polarity and then the pulse V2B becomes a positive polarity. Consequently, charges are read out of the pixels applied by the V2A pulse and then charges are read from the pixels applied by the V2B pulse. Note that the pulses V2A and V2B have respective positive polarity portions serving as read-out pulses.

Figure 10:
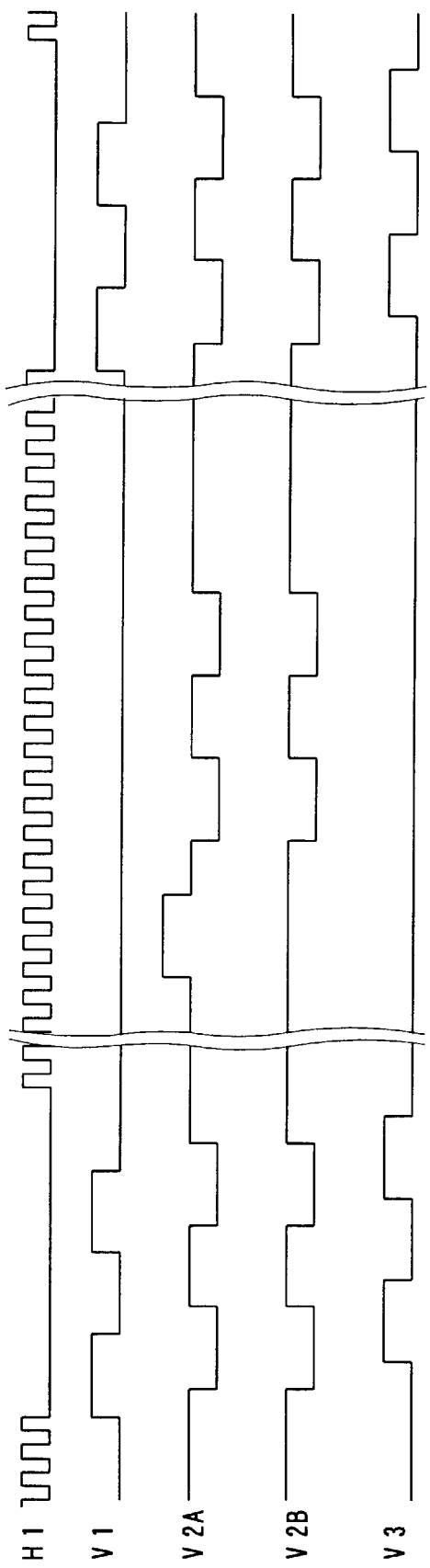
FIG. 10 is a timing chart showing another part of operation in the thinning-out reading mode.
Figure 11:
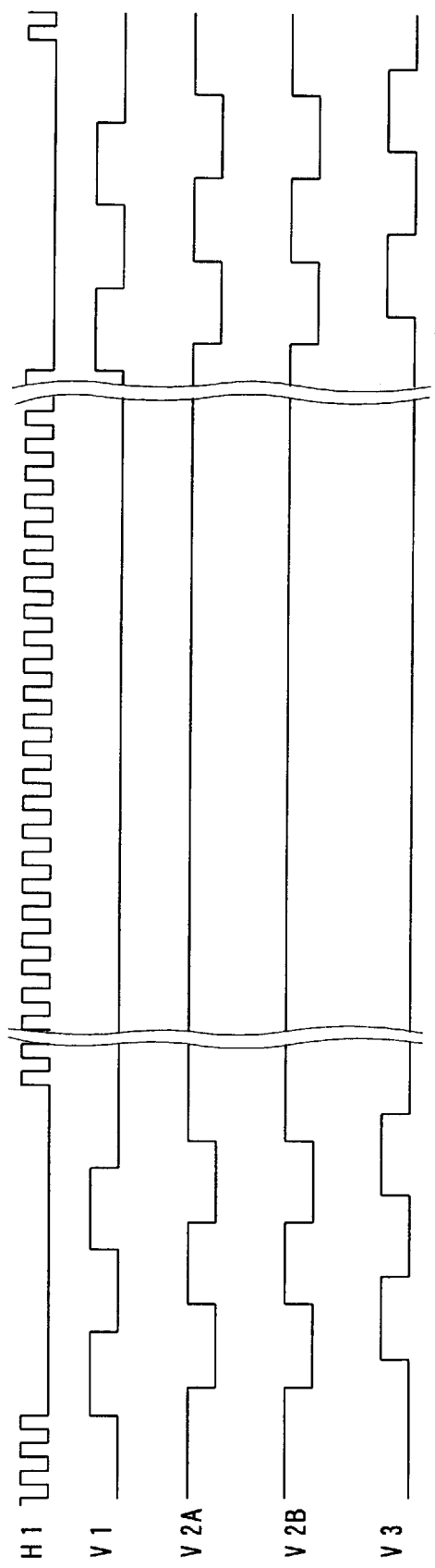
FIG. 11 is a timing chart showing still another part of operation in the thinning-out reading mode.

When a thinning-out reading scheme is selected, the respective pulses vary in the period A hi a manner as shown in FIG. 10. When the pulse V2A turns into a plus level, charges are read from the corresponding pixels onto the vertical transfer register. After charge reading out, the pulses V2A and V2B assume a minus level twice, transferring vertically the charges by 2 lines. As can be seen in FIG. 11, the pulses V2A and V2B become a minus level in other predetermined timing than the period A. In almost the same timing, the pulses VI and V3 also become a minus level. As a result, the charges are transferred in the vertical direction. The vertically transferred charges are thereafter horizontally transferred by the pulse HI and then outputted from the CCD imager 20.

Figure 13:
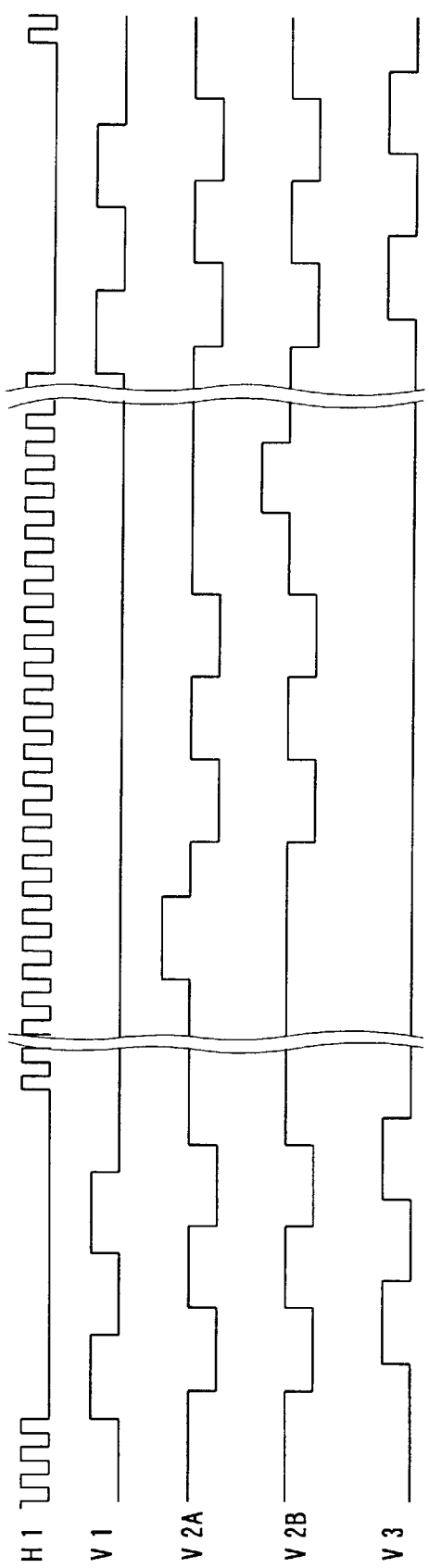
FIG. 13 is a timing chart showing another part of operation in the pixel-mixing reading mode.

When a pixel-mixing reading scheme is selected, the pulses in the period A vary in a manner as shown in FIG. 13. The pulse V2A assumes a plus level once, and then the pulses V2A and V2B simultaneously assume a minus level twice. This causes the first-read charges to be vertically transferred by 2 lines. Subsequently, the pulse V2B assumes a plus level once, and the charges read out in response thereto are mixed with the vertically-transferred charges. In other periods than the period A, the pulses vary in a manner shown in FIG. 14. As a result of this, the mixed charges are transferred in the vertical direction. The mixed charges, after vertical transfer, are horizontally transferred by the pulse H1.

Figure 15:
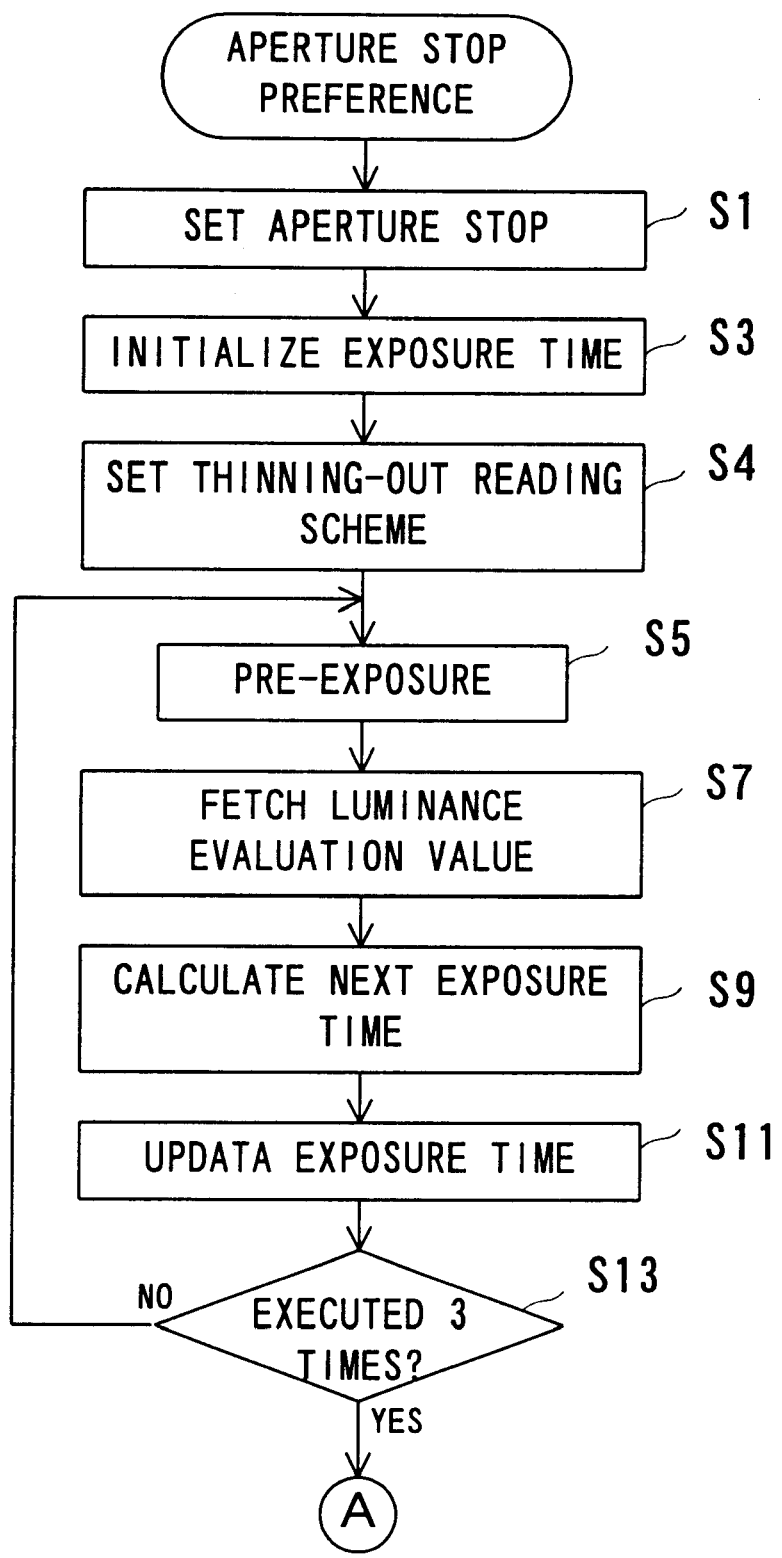
FIG. 15 is a flowchart showing part of operation in the FIG. 1 embodiment.
Figure 16:
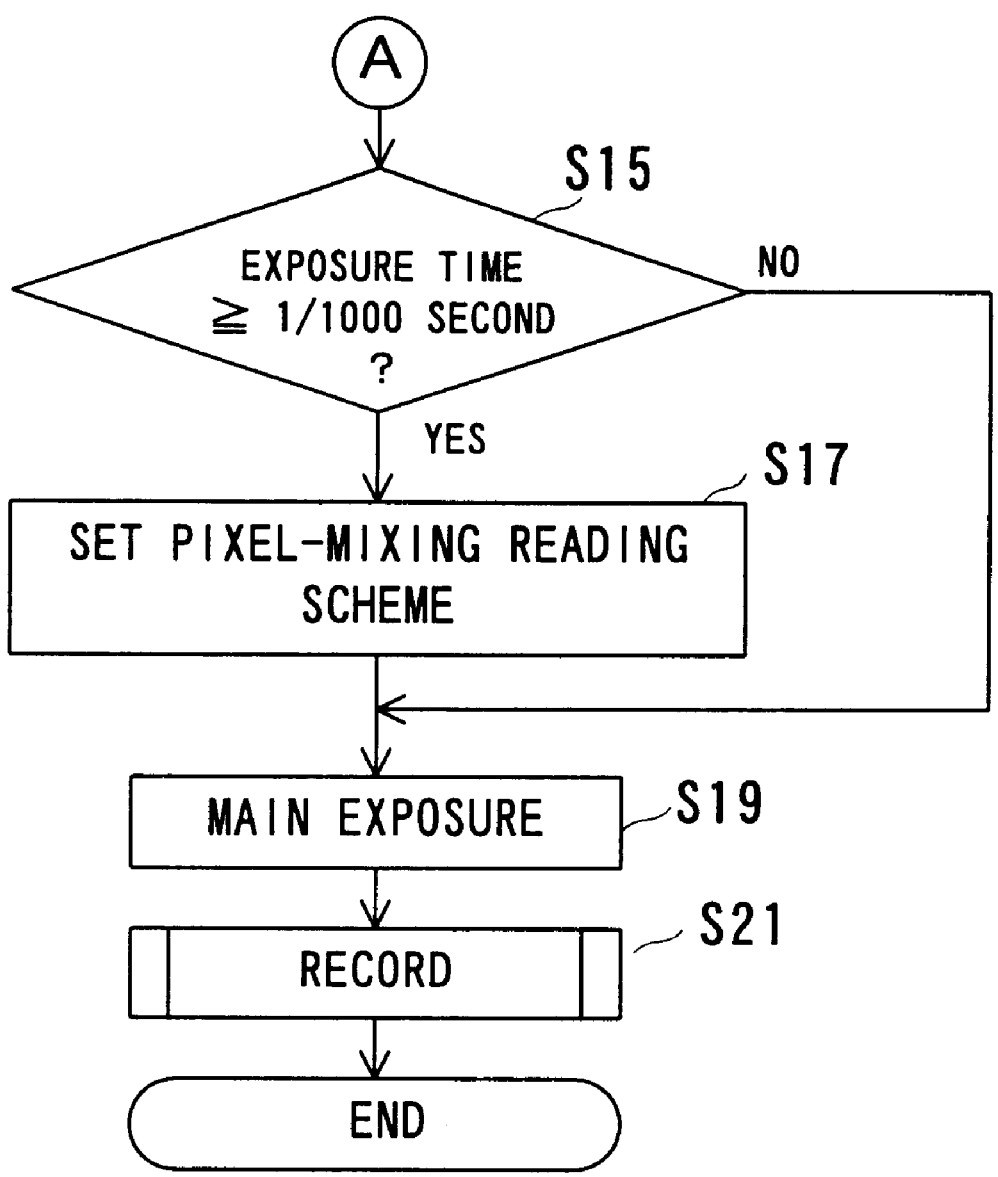
FIG. 16 is a flowchart showing another part of operation in the FIG. 1 embodiment.

The microcomputer 40 performing processing represented by a flowchart shown in FIG. 15 and FIG. 16 to calculate a main-exposure amount and record a taken subject image onto a recording medium 44. Note that the process of this flowchart commences in response to pushing the release button 48.

First, in step SI setting is made on aperture stop to a predetermined F value, and in step S3 an exposure time (shutter speed) is initialized. That is, initial shutter speed data of $1/250$ second is set onto the TG 22. Subsequently, in step S4 the switch SW2 is switched to a decoder 22i side to set a thinning-out reading scheme onto the TG 22, and in step S5 an instruction is provided to the TG 22 to take a picture. The TG22 performs a pre-exposure according to the shutter speed data setting, and reads out created charges by a thinning-out reading scheme.

The microcomputer 40 in step S7 fetches a luminance evaluation value outputted from the arithmetic operator 38, based on a camera signal obtained by the pre-exposure. The microcomputer 40 in step S9 then calculates a next-time shutter speed. Specifically, the luminance evaluation value is compared with a target evaluation value to be obtained in an optimal exposure state, calculating a shutter speed that the luminance evaluation value is coincident with the target evaluation value. For example, if the luminance evaluation value is "50" and the target evaluation value is "100", then the luminance is half of that of an optimal state and, accordingly, a next-time exposure time is set to be $1/125$ second. The microcomputer 40 in step S11 updates the shutter speed data to be set to the TG22, and in step S13 determines whether or not the process of the steps S5–S11 has been executed three times or not or not. That is, this process is repeated three tunes in order to accurately calculate a shutter speed at which a desired exposure is to be obtained (optimal shutter speed).

If determined "YES" in the step S13, the microcomputer 40 in step S15 compares the optimal shutter speed (optimal exposure time) with time data of $1/1000$ second. If the optimal exposure time is equal to or greater than $1/1000$ second, then in step S17 the switch SW2 is switched to the decoder 22j side to set a pixel-mixing reading scheme. Then, the process proceeds to step S19. Meanwhile, if the optimal exposure time is less than $1/1000$ second, the process proceeds to step S19 while maintaining the thinning-out reading scheme. Accordingly, in the case that the optimal exposure time is for example $1/500$ second, then a pixel-mixing reading scheme will be selected.

Because this embodiment employs an electronic shutter of FIG. 4 for shutter control, required charges are stored after sweeping away unwanted charges. Charge reading out is conducted when a predetermined storage period has elapsed. This means that, in the pixel-mixing reading scheme for reading out pixels at different timing, the higher the increase in shutter speed the greater the deviation in timing of reading increases. That is, as the exposure time decreases the difference increases between a charge amount to be read out earlier and a charge amount to be read later. On the contrary, this embodiment switches between the charge reading schemes depending upon an optimal shutter speed value. Note that a change-over threshold was taken $1/1000$ second because it requires $1/1000$ second to transfer read-out charges by 1 line.

The microcomputer 40 in step S19 instructs the TG22 to take a picture. As a result of this, a main exposure is effected at an optimal shutter speed. This produces charges to be read out by a desired scheme. If a camera signal is outputted from the CCD imager 20 in this manner, the microcomputer 40 in step S21 performs a recording process. The camera signal is inputted through the switch SW1 to the signal processing circuit 42 where it is subjected to a predetermined process. The signal processing circuit 42 outputs a still image signal to be recorded on the recording medium 44.

Figure 14:
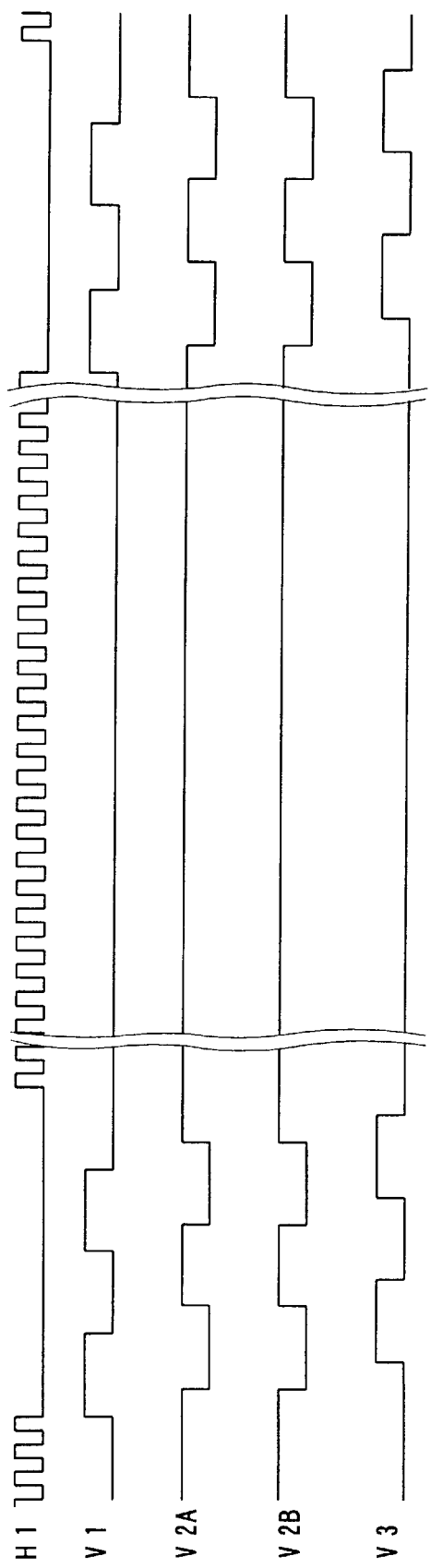
FIG. 14 is a timing chart showing still another part of operation in the pixel-mixing reading mode.

According to this embodiment, by selecting a pixel-mixing reading scheme, a filter process, as shown in FIG. 14, is performed in the CCD imager 20. This can eliminate aliasing components from a camera signal without the necessity of adding a filter circuit. Also, because the pixel-mixing reading scheme was selected only when the optimal shutter speed is low, there is no possibility of occurring deviation in charge amount largely between the charges to be first read out and those to be read subsequently.

Incidentally, because this embodiment has been explained using an aperture-stop preference mode, it is natural that this invention is applicable also to a shutter speed preference mode or program AE mode. In the shutter speed preference mode the exposure amount is changed by controlling a stop amount while in the program AE mode the exposure amount is varied by controlling both the shutter speed and aperture stop. Consequently, it is possible to obtain a camera signal without introducing aliasing components by limiting the shutter speed to be set in the shutter speed preference mode to a speed less than 1/1000 second.

Also, although this embodiment was explained on the case to taking a still picture, it is needless to say that this invention is also applicable in shooting a motion picture. Meanwhile, this invention is also applicable to a through-image mode in which motion pictures (through-pictures) are displayed in real time on a liquid crystal display.

Furthermore, although in this embodiment the shutter speed was controlled by the electronic shutter, the shutter speed may be controlled by so-called a mechanical shutter in taking a still picture. Also, although in this embodiment a thinning-out reading scheme was set during a pre-exposure, it is of course possible to set a pixel-mixing reading scheme in place thereof. Furthermore, although this embodiment employed the primary color filter having R, G and B color components in the Bayer arrangement, a complimentary color filter having color components of Ye, Cy, Mg and G as shown in FIG. 17 may be used in place of the primary color filter.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera comprising:
    a color filter formed by a plurality of color elements having N (N: integer greater than one) of colors distributed;
    an imager having a plurality of light receiving elements respectively corresponding to said plurality of color elements;
    a determiner for determining an exposure period of said imager by evaluating a luminance of an object scene;
    a sweeper for sweeping at a start timing of the exposure period charges generated by said plurality of light receiving elements;
    a reader for reading after a lapse of the exposure period the charges generated by at least a part of said plurality of light receiving elements; and
    a changer for changing a reading scheme of said reader between a first scheme and a second scheme depending upon the exposure period, wherein
        said plurality of light receiving elements include a plurality of first light receiving elements which respectively correspond to a plurality of first color elements having N colors distributed, and a plurality of second light receiving elements which respectively correspond to a plurality of second color elements having N colors distributed,
        the first scheme is a scheme for reading only first charges generated by said plurality of first light receiving elements,
        the second scheme is a scheme for reading at a first timing the first charges, and reading at a second timing second charges generated by said plurality of second light receiving elements so as to mix with each other the read first charges and second charges which correspond to the same color of the color elements, and
        said changer validates the first scheme when the exposure period is equal to or less than a threshold value, and validates the second scheme when the exposure period is greater than the threshold value.

2. A digital camera according to claim 1, wherein
    said imager has a vertical transfer register, and
    said reader includes a first charge reader for reading the first charges onto said vertical transfer register, a vertical transfer or for transferring the first charges read onto said vertical transfer register in a vertical direction, and a second charge reader for reading the second charges onto said vertical transfer register when said first charges have been transferred in the vertical direction by a predetermined distance.

3. The digital camera according to claim 2, further comprising:
    an exposure device to expose a subject image to said CCD imager;
    a calculation device for calculating an optimal amount of exposure by said CCD imager;
    a setting device for setting said optimal amount of exposure to said exposure device; and
    a disabler for disabling said second charge reader depending upon said optimal amount of exposure.

4. The digital camera according to claim 3, wherein said optimal amount of exposure is defined based on a shutter speed, and said disabler disables said second charge reader when said shutter speed is higher than a predetermined value.

5. A digital camera according to claim 2, wherein
    said changer changes the reading scheme by enabling/disabling the second charge reader.

6. A digital camera according to claim 2, wherein
    said vertical transfer register is formed by a plurality of metals, and at least three of said plurality of metals are assigned to one of said plurality of light receiving elements.

7. A digital camera according to claim 1, wherein
    said color filter is a filter arranged with primary colors of color elements in a Bayer arrangement.

* * * * *